(12) United States Patent
Hirota et al.

(10) Patent No.: US 6,220,769 B1
(45) Date of Patent: Apr. 24, 2001

(54) ROTATION DETECTION MECHANISM AND AN APPARATUS PROVIDED WITH SAME

(75) Inventors: Toshihiko Hirota, Sakai; Kazuhiko Kojima, Kyoto, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/343,202

(22) Filed: Jun. 30, 1999

(30) Foreign Application Priority Data

Jul. 1, 1998 (JP) .................................................. 10-185862

(51) Int. Cl.[7] ........................................................ G03B 1/00
(52) U.S. Cl. .............................................. 396/411; 396/87
(58) Field of Search .................................. 396/74, 75, 83, 396/85, 86, 87, 387, 406, 409, 411, 79

(56) References Cited

U.S. PATENT DOCUMENTS

| | | | |
|---|---|---|---|
| 4,615,600 | * 10/1986 | Nakajima et al. | 396/259 |
| 4,958,177 | * 9/1990 | Akitake | 396/132 |
| 5,025,277 | * 6/1991 | Inoue et al. | 396/79 |
| 5,602,608 | * 2/1997 | Asakura et al. | 396/85 |
| 5,634,148 | * 5/1997 | Kunishige et al. | 396/86 |
| 5,640,636 | 6/1997 | Yokoyama et al. | 396/411 |
| 6,039,476 | * 3/2000 | Katagiri et al. | 396/418 |

FOREIGN PATENT DOCUMENTS 9-060716  3/1997  (JP) .

* cited by examiner

*Primary Examiner*—David M. Gray
(74) *Attorney, Agent, or Firm*—Burns, Doane, Swecker & Mathis, LLP (57) ABSTRACT

An apparatus comprising planet gears 3 which rotate in engagement with a pinion gear 2 that itself rotates integratedly with the rotating shaft 12a of a motor 12 such that the planet gears 3 rotate around the periphery of the rotating shaft 12a, a carrier 4 which rotates integratedly to match the rotation of the planet gears 3 while supporting the planet gears in free rotation, and a photoreflector 9 for detecting rotation by detecting a rotation detecting part comprising a reflecting surface 4a and a non-reflecting surface 4b provided on the exterior surface of the carrier 4.

20 Claims, 7 Drawing Sheets

ROTATION DETECTION MECHANISM AND AN APPARATUS PROVIDED WITH SAME

This application is based on Application No. 10-185862 filed in Japan, the content of which is hereby incorporated by reference.

BACKGROUND OF THE INVENTION

1. Field of the Invention

The present invention relates to rotation detection in a speed reduction mechanism using a planet gear mechanism in a drive force transmission mechanism or an apparatus using same.

2. Description of the Related Art

Various drive force transmission mechanisms provided with the differential gear mechanism using a planet gear disclosed, for example, in U.S. Pat. No. 5,640,636 have been proposed to obtain a high deceleration ratio in a compact space.

In speed reduction mechanisms achieved through a differential gear mechanism using a planet gear, however, it is difficult to assure a space for the because the gears occupy most of the space within the deceleration unit. Even assuming the detection member is installed, the deceleration unit is disadvantageously enlarged by an amount equal to the size of the detection member.

Furthermore, when rotation detection is accomplished at fine resolution outside the speed reduction mechanism achieved through a differential gear mechanism, the number of parts used increases which is a great demerit from the perspectives of cost and space due to the need to add an acceleration transmission system separated from the output shaft of the speed reduction mechanism, or arrange the detection member on the motor shaft on the side opposite the deceleration unit. The detection accuracy is disadvantageously reduced by gear backlash particularly when an acceleration transmission system is added.

SUMMARY OF THE INVENTION

In view of the aforesaid disadvantages, an object of the present invention is to provide a rotation detection mechanism of fine resolution which is compact and does not increase the number of parts within in a speed reduction mechanism achieved through a differential gear mechanism using a planet gear. Another object of the invention is to provide an apparatus provided with such a rotation detection mechanism.

To attain these objects, one aspect of the present invention comprises a planet gear which rotates in engagement with a sun gear that itself rotates integratedly with the output shaft of a rotation drive source such that the planet gear rotates around the periphery of the output shaft, a carrier which rotates integratedly to match the rotation of the planet gears while supporting the planet gears in free rotation, a first rotation detector provided on the exterior surface of the carrier or the sun gear, and a second rotation detector for detecting rotation by detecting the first rotation detector.

One example of the second rotation detector comprises a photoreflector. The first rotation detector comprises a reflecting surface for reflecting a light flux projected from a light projector of the photoreflector toward a photoreceptor, and a non-reflecting surface having different reflection angle than the reflecting surface so as to not reflect light flux toward the photoreceptor. A secondary reflecting surface is provided to again reflect the light flux projected from the light projector of the photoreflector and reflected by the non-reflecting surface so as to not impinge the photoreceptor.

Alternatively, another example of the first rotation detector comprises a reflecting surface for reflecting a light flux projected from the light projector of the photoreflector toward a photoreceptor, and a non-reflecting surface having a lower reflectivity than the reflecting surface so as to not reflect the light flux toward the photoreceptor.

An optical path regulator is provided to regulate the optical path of the light flux from the photoreflector. Furthermore, a protuberance extends from the vicinity of the photoreflector toward the interior diameter of the first rotation detector.

Alternatively, another example of the second rotation detector comprises an MR element.

The rotation detector mechanism is used in a drive force transmission mechanism for accomplishing a focusing operation or a zoom operation of the lens barrel of a camera.

These and other objects, advantages, and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
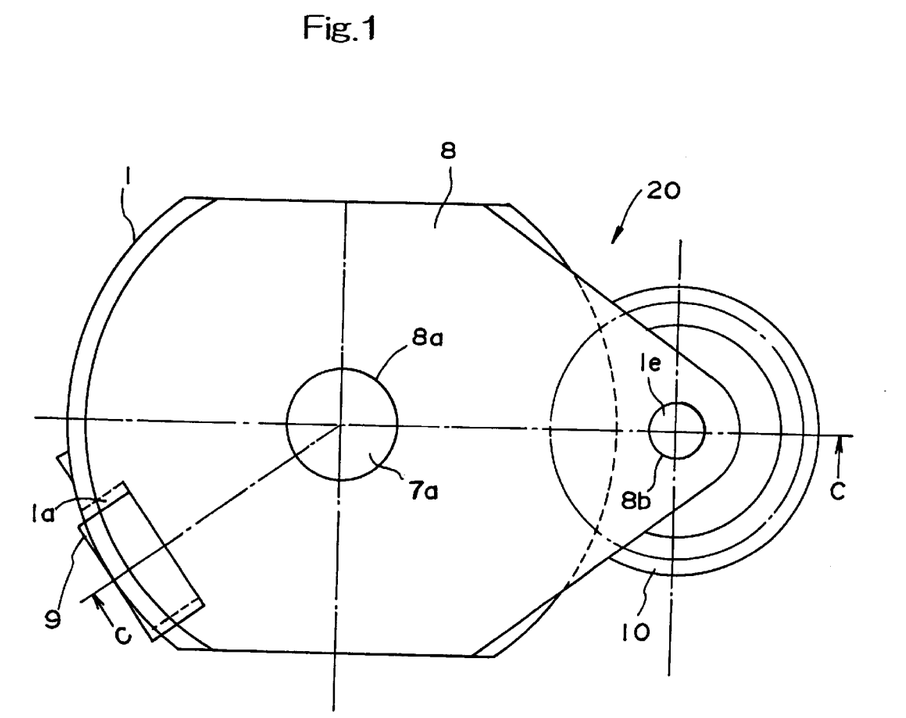
FIG. 1 is a plan view of the speed reduction unit of a first embodiment.
Figure 2:
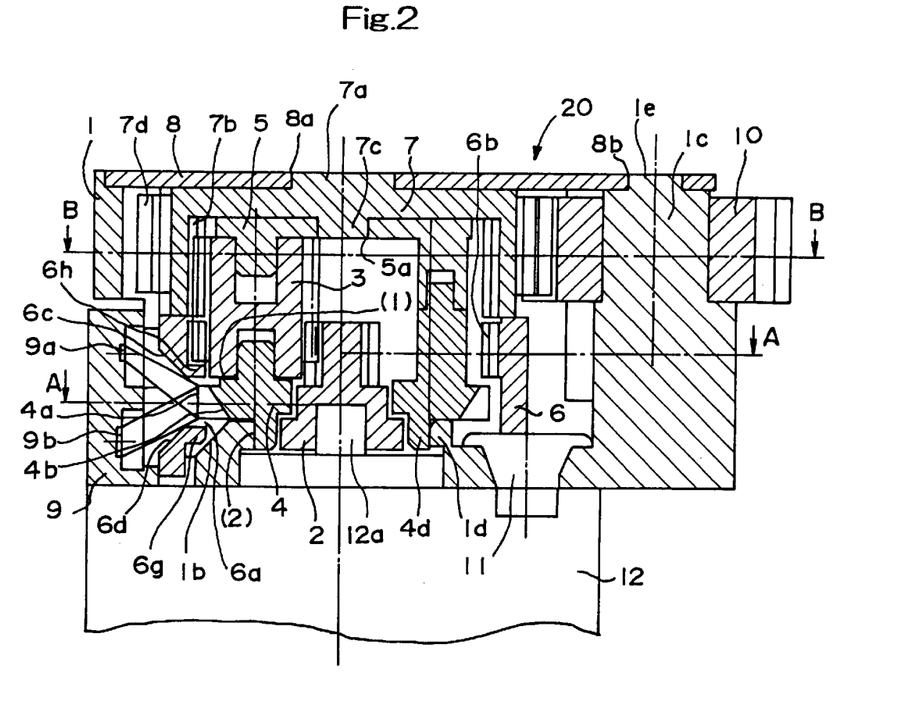
FIG. 2 is a vertical section view of the speed reduction unit on the C—C section plane in FIG. 1.
Figure 3:
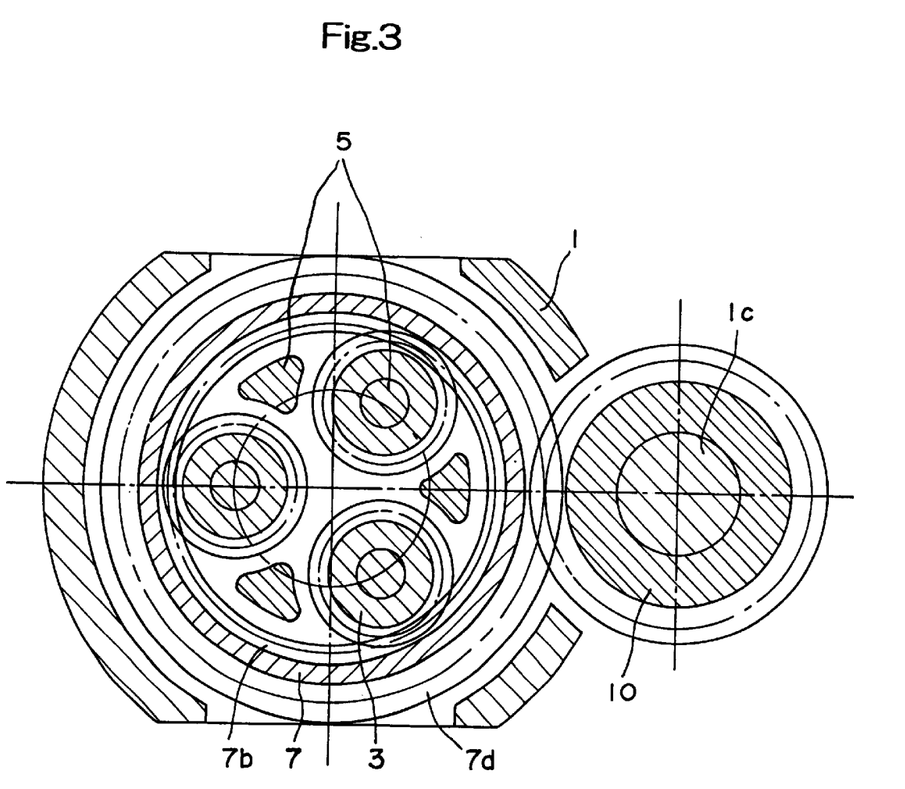
FIG. 3 is a horizontal section view of the speed reduction unit on the B—B section plane in FIG. 2.
Figure 4:
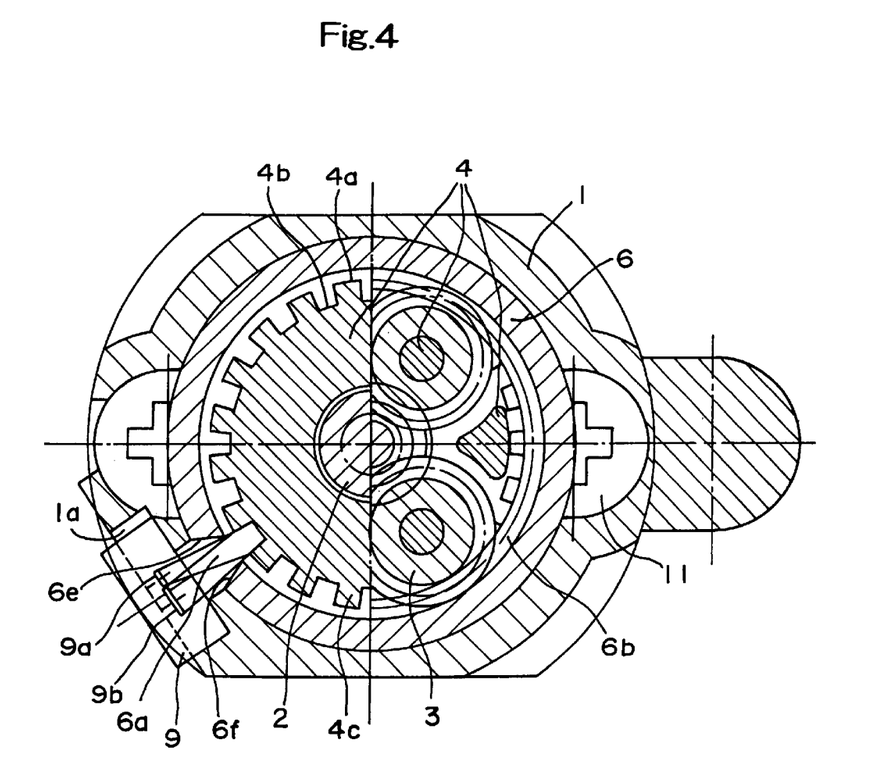
FIG. 4 is a horizontal section view of the speed reduction unit on the A—A section plane in FIG. 2.

The embodiments of the present invention are described hereinafter with reference to the accompanying drawings. FIG. 1 is a plan view of a speed reduction unit 20 provided with a speed reduction mechanism achieved through a differential gear mechanism using a planet gear. FIG. 2 is a vertical section view of the unit 20 on the C—C section plane of FIG. 1, FIG. 3 is a horizontal section view of the unit 20 on the B—B section plane in FIG. 2, and FIG. 4 is a horizontal section view of the unit 20 on the A—A plane in FIG. 2. In these drawings, reference number 1 refers to an approximately cylindrical case accommodating the speed reduction mechanism, reference number 2 refers to a pinion gear comprising a sun gear for transferring a drive force from a motor 12 described later, and reference number 3 refers to a planet gear which engages the pinion gear 2. There are three planet gears 3 disposed around the exterior surface of the pinion gear 2, and these planet gears 3 are supported vertically by approximately disciform carriers 5 and 4 so as to be freely rotatable.

On the exterior surface of the carrier 4 on the outer side of the planet gear 3 is provided an approximately cylindrical fixed internal gear 6 which fixedly fits the bottom surface of the casing 1. A gear portion 6b is provided on the interior surface of the gear 6, and engages the respective planet gears 3. A cap-like output internal gear 7 is fitted on the top surface from the exterior surface of the carrier 5. Gear teeth 7b are provided on the interior surface of the gear 7, and the gear teeth 7b also engage the respective planet gears 3. That is, the planet gears 3 extend in the rotational axis direction from the fixed internal gear 6 across to the output internal gear 7. A plates-like cover 8 is provided on the top of the casing 1, and a hole 8a is provided in the center of the cover 8 into which fits a protrusion 7a on the top center of the gear 7, so as to support the gear 7 in free rotation.

A protrusion 7c on the bottom center of the gear 7 fits into a hole 5a in the center of the carrier 5, so as to support the carrier 5 in free rotation. The carrier 4 fits into and is connected to the carrier 5. A ring-like protrusion 4d on the bottom of the carrier 4 fits into a hole 1d in the bottom center of the casing 1, so as to support the carrier 4 in free rotation. The pinion gear 2 passes through the center of the carrier 4. Reference number 1c refers to a fixed shaft integratedly formed with the casing 1, and which supports the output gear 10 which is fitted thereon so as to be freely rotatable. The gear 10 engages the gear teeth 7d provided on the exterior surface of the gear 7, and functions to transmit the output from the speed reduction unit 20 to the outside.

The cover 8 functions as a holder for the output gear 10 by inserting the protrusion 1e on the top of the fixed shaft 1c into the hole 8b provided near the edge of the cover 8. Below the speed reduction unit 20, a motor 12 is mounted by means of machine screws 11 in contact with the bottom surface of the casing 1, and the previously mentioned pinion gear 2 is mounted on the rotating shaft 12a of the motor 12. The motor 12 is a DC motor capable of bidirectional rotational drive. The area below the motor 12 is omitted in FIG. 2.

In the aforesaid construction, the rotational output of the motor 12 is transmitted to the pinion gear 2 through the rotating shaft 12a, such that when the pinion gear 2 rotates, the planet gears 3 rotate individually while rotating around the rotating shaft 12a in conjunction with the carriers 4 and 5. Since the gear teeth 6b of the fixed internal gear 6 which engage the planet gears 3, and the gear teeth 7b of the output internal gear 7 which similarly engage the planet gears 3 respectively have different numbers of gear teeth, the gear 7 is rotated at a set deceleration ratio via the rotation of the planet gears 3. This arrangement has been in common use previously.

The rotation of the output internal gear 7 is output to the outside by transmission to the output gear 10 which engages the gear teeth 7d provided on the exterior surface of the gear 7. This construction reduces the size in the axial direction. Furthermore, separation between shafts due to the drive torque of the motor 12 is prevented by the cover 8 which is fitted across the shafts of the gear 7 and the output gear 10.

The photoreflector 9 fits into and is supported by an opening 1a on the side surface of the casing 1, and the light projector eleent 9a and the photoreceptor element 9b are arranged along the axial direction of the rotating shaft 12a of the motor 12 described later as a detection member for rotation detection. Furthermore, the normal line direction of the light projecting plane and the photoreceptor plane is arranged so as to face the axial center of the rotating shaft 12a. An opening 6a is provided on the side surface of the fixed internal gear 6 facing the opening 1a on the side surface of the casing 1, such that the light flux emitted from the photoreflector 9 reaches the side surface of the carrier 4.

Reflective surfaces 4a for reflecting the light flux emitted from the light projector element 9a of the photoreflector 9 toward the photoreceptor element 9b, and non-reflective surfaces 4b having a different angle such that the light flux does not impinge the photoreceptor element 9b are arranged alternatingly in several tens of sets on the exterior side surface of the carrier 4. Optical path frames 6c, 6d, 6e, and 6f comprising inclined surfaces are provided at the opening 6a of the fixed internal gear 6 to restrict the light flux entering into the photoreceptor element 9b without blocking the optical path from the light projector element 9a to the photoreceptor element 9b via the reflective surfaces 4a (refer to FIGS. 2 and 4).

Among these optical path frames, the frames 6c and 6d restrict the optical paths in the rotational axis direction of the carrier 4, and the frames 6e and 6f regulate the optical paths in the circumferential direction thereof. This arrangement prevents a reduction in the output amplitude from the photoreflector and prevents deterioration of the signal to noise ratio (S/N) of the light from the reflective surface 4a and the light from the non-reflective surface 4b by unnecessary light from outside the reflective surface 4a entering the photoreceptor element 9b. To prevent the reflected light of the non-reflective surface 4b from entering the photoreceptor element 9b via secondary reflection, an inclined surface 1b is formed as a secondary reflection surface on the casing 1 at the bottom on the interior side from the opening 6a of the fixed internal gear 6. The reflected light of the surface 1b is reflected toward an area other than the photoreceptor element 9b.

It can be understood from a comparison of the optical path frames 6c and 6d shown in FIG. 2 and the optical path frames 6e and 6f shown in FIG. 4 that the angle of the opening is smaller for the latter. This arrangement allows detection in a narrow area in the circumferential direction of the carrier 4 by arranging the light projector elements 9a and the photoreceptor elements 9b of the photoreflector 9 along the axial direction of the rotating shaft 12a of the motor 12 so as to not blunt the output wave even when using a fine pitch for the pulse detector shown in FIG. 4 to detect a fine rotation pulse.

As shown in FIG. 2, protrusions 6h and 6g are provided in the vertical area of the opening 6a from the interior surface toward the interior side of the fixed internal gear 6. This arrangement functions as a shield to avoid a reduction in detection accuracy by preventing the abrasion chips of the gears from adhering to the photoreceptor 9. This arrangement also prevents lubricant such as grease applied to the frictional portion (1) between the planet gears 3 and the carrier 4 and the frictional portion (2) between the carrier 4 and the casing 1 from spattering and adhering to the photoreceptor 9. Although not shown in the drawings, as an alternative to the carrier 4, a member may be provided, for example, which extends in the radius direction of the bottom of the pinion gear 2 and functions as a pulse detector 4c on the exterior surface of the pinion gear 2 to detect the rotation pulse.

Figure 5:
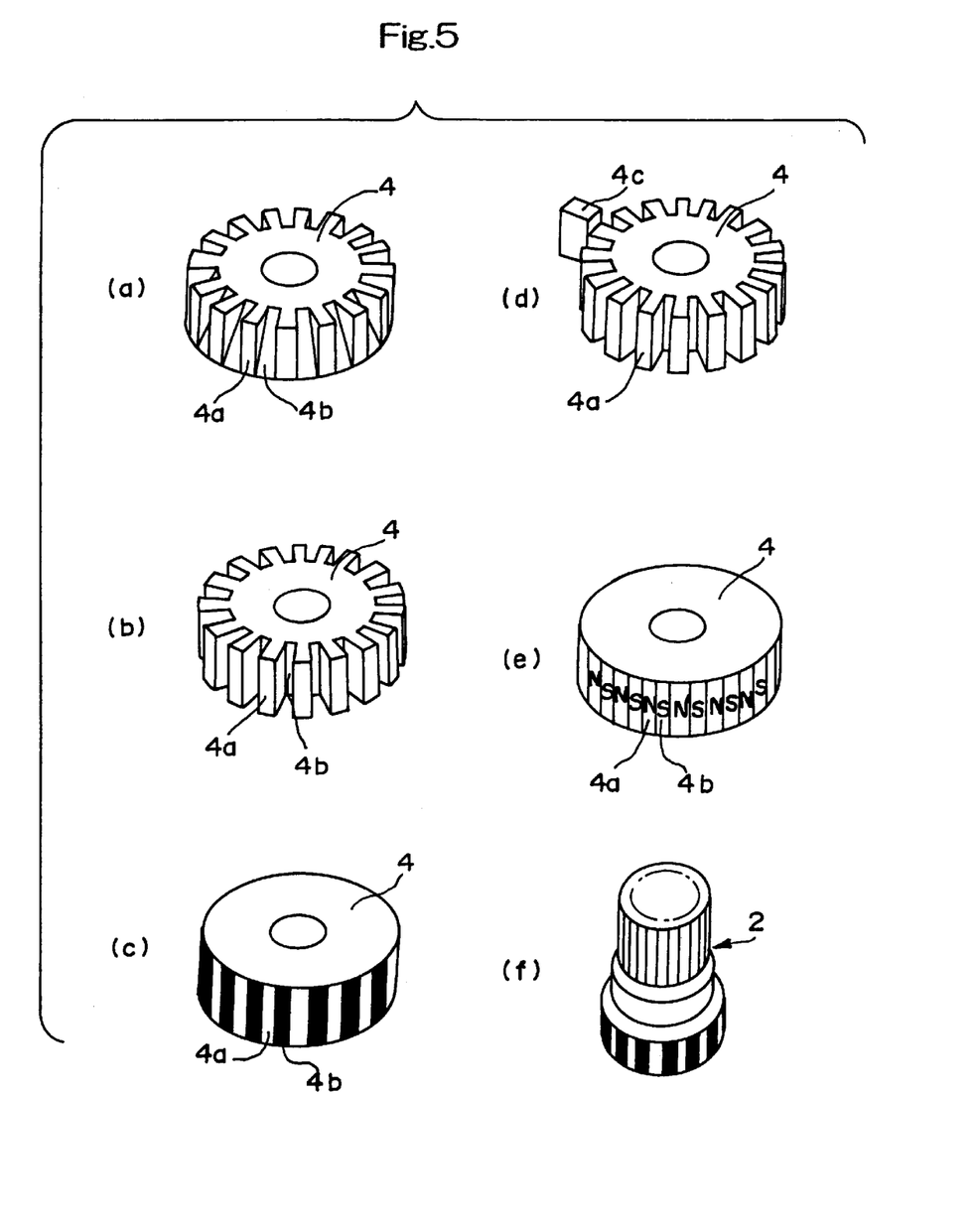
FIG. 5 is a schematic perspective view of each embodiment of the rotation detector in the carrier.

FIG. 5 is a schematic perspective view of various detectors of the carrier 4. In the present embodiment, the construction shown in section (a) is used to generate a rotation pulse by changing the angle of the reflecting surface 4a and the non-reflecting surface 4b relative to the photoreflector 9. However, the present invention is not limited to this construction inasmuch as, for example, another construction shown in section (b) may be used to generate a rotation pulse by changing the distance between the reflecting surface 4a and the non-reflecting surface 4b relative to the photoreceptor 9. Another alternative shown in section (c) is a construction for generating a rotation pulse by means of a repeating pattern of increasing the reflectivity of the reflecting surface 4a and decreasing the reflectivity of the non-reflecting surface 4b.

Another alternative, shown in section (d), has the carrier 4 constructed as a magnetic body, and generates a rotation pulse by forming a number of protrusions 4a on the exterior surface of the carrier 4, and arranging a Magneto Resistive element (MR element) 4c on the periphery of the carrier 4 in place of the photoreflector 9, and reading the change in the magnetic field caused by the movement of the protuberances in the circumferential direction. As shown in section (e), instead of providing the aforesaid protuberances, magnetic poles 4a and 4b having different polarities may be alternated on the exterior surface of a carrier 4 comprising a magnetic body, so as to generate a rotation pulse by reading the change in the magnetic field caused by the movement of the magnetic poles in the circumferential direction. As shown in section (f), a rotation detector may be provided on the pinion gear 2, i.e., on the sun gear, rather than on the carrier 4. The construction shown in section (f) is provided with reflecting surfaces and non-reflecting surfaces equivalent to those shown in section (c).

Figures 6A, 6B:
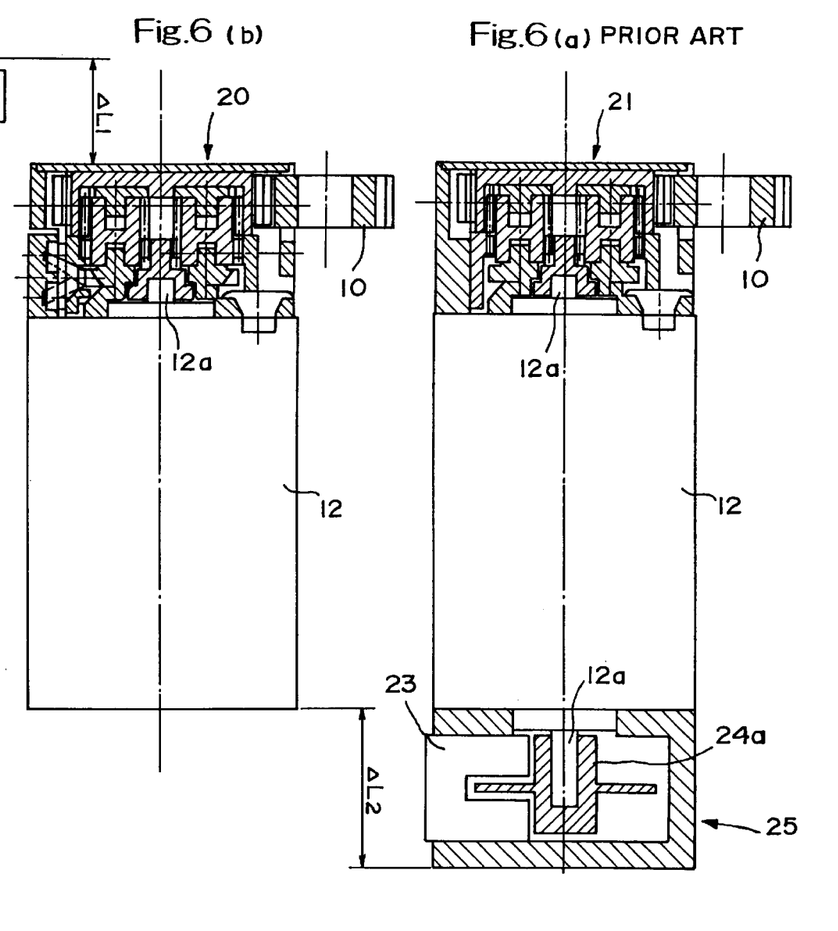
FIGS. 6(a) through 6(c) compare the sizes of the prior art and the present embodiments of the speed reduction unit and the rotation detection mechanism.
Figure 6C:
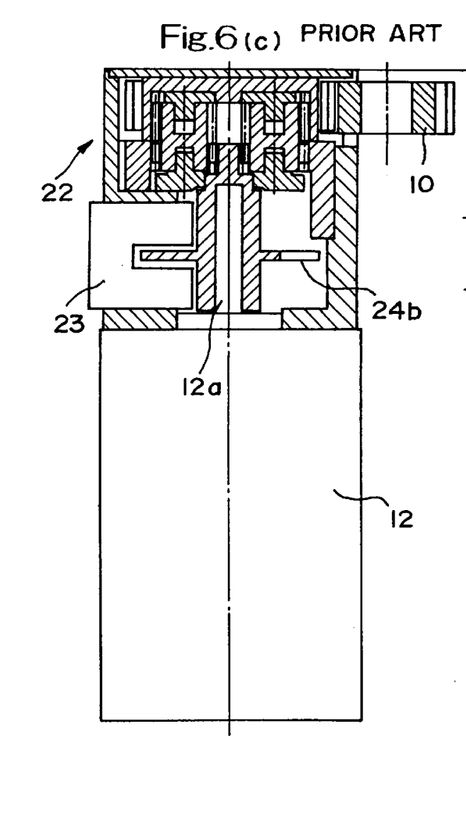

FIGS. 6(a) through 6(c) compares the sizes of the prior art and the present embodiment of the speed reduction unit and the rotation detection mechanism. FIG. 6(a) shows an example of prior art using a motor 12 having a rotating shaft 12a which extends in bilateral vertical directions in the drawing, and is provided with a speed reduction unit 21 above the motor 12, and a rotation detection mechanism 25 below the motor 12. A rotating blade 24a is mounted on the bottom end of the rotating shaft 12a, so as to generate a rotation pulse by intermittently blocking the projection/reception light of a photointerrupter 23 via the rotation of the rotating blade 24a.

FIG. 6(b) shows the embodiment having a construction including a rotation detection mechanism in a speed reduction unit 20 as described above. Accordingly, the rotating shaft 12a of the motor 12 may protrude only on the top side in the drawing. FIG. 6(c) is another example of the prior art using a motor 12 having a large rotating shaft 12a protruding only on the top side, and provided with a speed reduction unit 22 with an integrated rotation detection mechanism on the top side of the motor 12.

In this instance, a rotating blade 24b integratedly formed with the pinion gear of the speed reduction mechanism is mounted on the rotating shaft 12a, so as to generate a rotation pulse by intermittently blocking the projection/reception light of the photointerrupter 23 via the rotation of the rotating blade 24b. The construction wherein the output gear 10 protrudes on the speed reduction unit side is common to the three examples. As can be understood from each drawing, the speed reduction unit of the present embodiment shown in FIG. 6(b) is more compact in the rotational axis direction by ΔL1 and ΔL2, respectively, relative to the conventional art shown in FIGS. 6(a) and 6(c).

Figure 7:
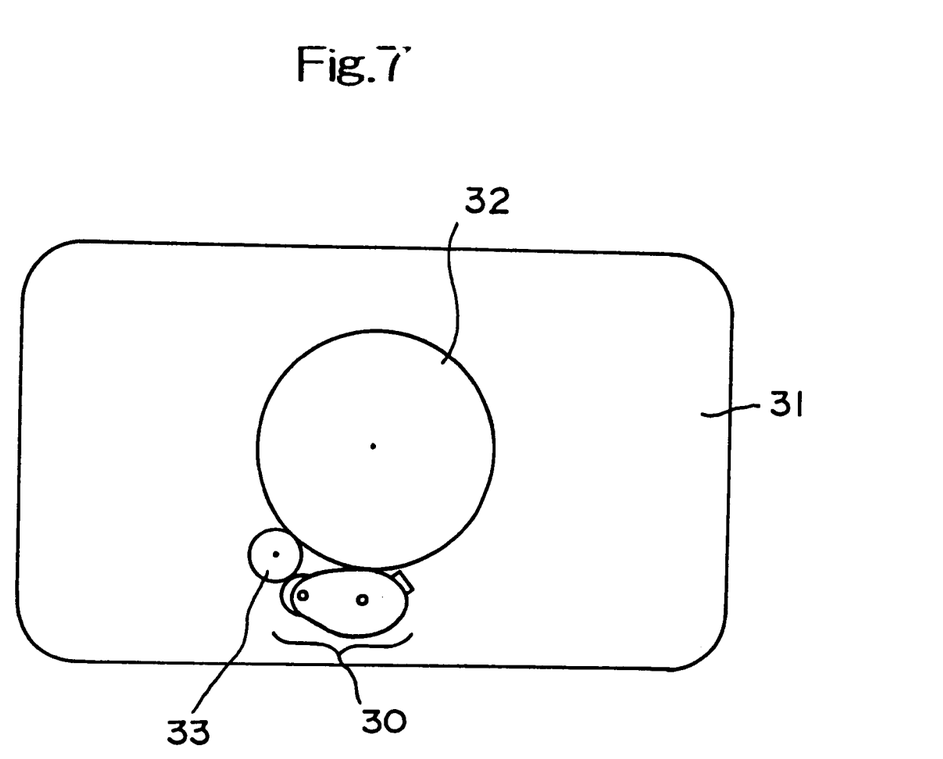
FIG. 7 is a schematic view of the entire camera of the first embodiment.

FIG. 7 is a schematic view of the entire camera of the present embodiment, and shows the camera from the front. As shown in the drawing, the motor, speed reduction mechanism, and rotation detection mechanism are integrated in a unit 30, which is disposed below a lens barrel 32 in the center of the camera body 31, and the output from the unit 30 is transferred to the lens barrel 32 via a gear 33, so as to accomplish the lens focusing operation and zooming operation. In this instance, the unit 30 is compact in the rotational axis direction, so as to provide a thin model camera body 31.

The present embodiment provides fine resolution detection in a compact form factor without increasing the number of parts in a speed reduction mechanism achieved through a differential gear mechanism using a planet gear.

Rotation detection can be accomplished with minimal backlash effect on fine resolution detection by restricting the length of the speed reduction mechanism in the output shaft direction or restricting the increase in size in the diameter direction of the speed reduction mechanism to a minimum.

Since the pulse detection pattern of the carrier can be achieved simply through the shape of the part, rotation detection can be accomplished easily at low cost.

Reduction in detection accuracy can be prevented by diffused reflection above secondary reflection of the projection light flux.

Erroneous detection and reduction of the S/N can be prevented by diffused reflection of the projection light flux. Rotation detection at fine resolution can be achieved because the amplitude of the photoreceptor element output is not easily reduced.

Excellent detection accuracy is possible by preventing adhesion of grease and debris from the gear teeth of the speed reduction mechanism to the rotation detection element.

The S/N is increased and detection accuracy improved by processing the secondary reflection light of the projection light flux.

The rotation detection unit is unaffected by dirt and the like, and rotation detection can be accomplished at fine resolution when a photoreflector is used.

The present invention is particularly effective in devices requiring compactness and high accuracy position control such as, for example, cameras or lenses for the cameras.

Although the apparatus of the present embodiment has been described in terms of a camera, the present invention is applicable to other apparatus.

Although the present invention has been fully described by way of examples with reference to the accompanying drawings, it is to be noted that various changes and modifications will be apparent to those skilled in the art. Therefore, unless otherwise such changes and modifications depart form the scope of the present invention, they should be construed as being included therein.

What is claimed is:

1. A rotation detection mechanism for use in a mechanism having a planet gear which rotates in engagement with a sun gear that itself rotates in accordance with a rotation of an output shaft of a rotation drive source such that the planet gear rotates around the periphery of the sun gear, and a carrier which rotates integratedly with the rotation of the planet gear while rotatably supporting the planet gear, said sun gear and said carrier each having two opposed surfaces connected at outermost radial edges thereof by at least one circumferential surface, said rotation detection mechanism comprising:

a rotation pattern element provided on the at least one circumferential surface of one of the carrier and the sun gear; and a rotation detector for detecting rotation of one of the carrier and the sun gear by detecting the rotation pattern element.

2. A mechanism according to claim 1, wherein said rotation detector comprises a photoreflector having a light projector and a photoreceptor.

3. A mechanism according to claim 2, wherein said rotation pattern element comprises a reflecting surface for reflecting a light flux projected from the light projector toward the photoreceptor, and a non-reflecting surface having a different reflection angle than a reflection angle of the reflecting surface so as to not reflect light flux toward the photoreceptor.

4. A mechanism according to claim 3, wherein a secondary reflecting surface is provided in a position to reflect the light flux projected from the light projector and reflected by the non-reflecting surface so as not to impinge the photoreceptor.

5. A mechanism according to claim 2, wherein said rotation pattern element comprises a reflecting surface for reflecting a light flux projected from the light projector toward the photoreceptor, and a non-reflecting surface having a lower reflectivity than a reflectivity of the reflecting surface so as to not reflect the light flux toward the photoreceptor.

6. A mechanism according to claim 1, wherein said rotation detector comprises a photoreflector having a light projector and a photoreceptor, said rotation pattern element includes a reflecting surface for reflecting a light flux projected from the light projector toward the photoreceptor, and a non-reflecting surface so as not to reflect light flux toward the photoreceptor, and wherein an optical path frame is provided to restrict an optical path of the light flux to/from the rotation pattern element.

7. A mechanism according to claim 6, wherein said optical path frame is provided with a protuberance which extends from the vicinity of the photoreflector toward the rotation pattern element.

8. A mechanism according to claim 1, wherein said rotation detector comprises a Magneto Resistive element.

9. An apparatus comprising:
a rotation drive source;
a sun gear which rotates in accordance with the output of said rotation drive source, said sun gear having two opposed surfaces connected at outermost radial edges thereof by at least one circumferential surface;
a carrier which is rotatable in accordance with the output of said rotation drive source, said carrier having two opposed surfaces connected at outermost radial edges thereof by at least one circumferential surface;
a planet gear which is rotatably supported on said carrier and engages with said sun gear such that said planet gear rotates around the periphery of said sun gear;
an output gear which is driven by said planet gear when said output gear engages with said planet gear; and
a rotation pattern element provided on the at least one circumferential surface of one of the carrier and the sun gear; and
a rotation detector for detecting rotation of one of the carrier and the sun gear by detecting the rotation pattern element.

10. An apparatus according to claim 9, wherein said rotation detector comprises a photoreflector having a light projector and a photoreceptor.

11. An apparatus according to claim 10, wherein said rotation pattern element comprises a reflecting surface for reflecting a light flux projected from the light projector toward the photoreceptor, and a non-reflecting surface having a different reflection angle than a reflection angle of the reflecting surface so as to not reflect light flux toward the photoreceptor.

12. An apparatus according to claim 11, wherein a secondary reflecting surface is provided in a position to reflect the light flux projected from the light projector and reflected by the non-reflecting surface so as not to impinge the photoreceptor.

13. An apparatus according to claim 10, wherein said rotation pattern element comprises a reflecting surface for reflecting a light flux projected from the light projector toward the photoreceptor, and a non-reflecting surface having a lower reflectivity than a reflectivity of the reflecting surface so as to not reflect the light flux toward the photoreceptor.

14. An apparatus according to claim 9, wherein said rotation detector comprises a photoreflector having a light projector and a photoreceptor, said rotation pattern element includes a reflecting surface for reflecting a light flux projected from the light projector toward the photoreceptor, and a non-reflecting surface so as to not reflect light flux toward the photoreceptor, and wherein an optical path frame is provided to restrict an optical path of the light flux to/from the rotation pattern element.

15. An apparatus according to claim 14, wherein said optical path frame is provided with a protuberance which extends from the vicinity of the photoreflector toward the rotation pattern element.

16. An apparatus according to claim 9, wherein said rotation detector comprises a Magneto Resistive element.

17. An apparatus according to claim 9, wherein said apparatus includes a lens barrel and wherein said output gear is engaged with a gear so as to move said lens barrel for focusing or zooming.

18. An apparatus according to claim 17, wherein said apparatus is provided with a camera body for supporting said lens barrel.

19. A unit comprising:
a rotation drive source;
a sun gear which rotates in accordance with the output of said rotation drive source, said sun gear having two opposed surfaces connected at outermost radial edges thereof by at least one circumferential surface;
a carrier which is rotatable in accordance with the output of said rotation drive source, said carrier having two opposed surfaces connected at outermost radial edges thereof by at least one circumferential surface;
a planet gear which is rotatably supported on said carrier and engages with said sun gear such that said planet gear rotates around the periphery of said sun gear;
an output gear which is driven by said planet gear when said output gear engages with said planet gear;
a rotation pattern element provided on the at least one circumferential surface of one of the carrier and the sun gear;
a rotation detector for detecting rotation of one of the carrier and the sun gear by detecting the rotation pattern element; and
a casing which supports said rotation drive source, said sun gear, said carrier, said planet gear, said output gear, said first rotation pattern element and said rotation detector.

20. A unit according to claim 19, wherein said rotation detector comprises a photoreflector having a light projector and photoreceptor, said rotation pattern element includes a reflecting surface for reflecting a light flux projected from the light projector toward the photoreceptor, and a non-reflecting surface so as not to reflect light flux toward the photoreceptor, and wherein an optical path frame is provided to restrict an optical path of the light flux to/from the rotation pattern element.

* * * * *